(12) United States Patent
Heldebrant et al.

(10) Patent No.: US 7,799,299 B2
(45) Date of Patent: Sep. 21, 2010

(54) CAPTURE AND RELEASE OF MIXED ACID GASSES WITH BINDING ORGANIC LIQUIDS

(75) Inventors: David J. Heldebrant, Richland, WA (US); Clement R. Yonker, Kennewick, WA (US)

(73) Assignee: Batelle Memorial Institute, Richland, WA (US)

( * ) Notice: Subject to any disclaimer, the term of this patent is extended or adjusted under 35 U.S.C. 154(b) by 0 days.

(21) Appl. No.: 12/360,717

(22) Filed: Jan. 27, 2009

(65) Prior Publication Data

US 2009/0136402 A1 May 28, 2009

Related U.S. Application Data

(60) Provisional application No. 61/023,994, filed on Jan. 28, 2008, provisional application No. 61/099,387, filed on Sep. 23, 2008.

(51) Int. Cl.
*B01D 53/60* (2006.01)

(52) U.S. Cl. .................................. 423/220; 423/222

(58) Field of Classification Search ............... 423/220, 423/222
See application file for complete search history.

(56) References Cited

U.S. PATENT DOCUMENTS

| | | | |
|---|---|---|---|
| 4,113,849 A * | 9/1978 | Atwood | 423/574.1 |
| 5,017,347 A | 5/1991 | Epperly et al. | |
| 5,170,727 A * | 12/1992 | Nielsen | 110/346 |
| 6,036,931 A | 3/2000 | Yoshida et al. | |
| 6,071,484 A * | 6/2000 | Dingman et al. | 423/229 |
| 7,459,134 B2 | 12/2008 | Cadours et al. | |
| 2003/0047309 A1* | 3/2003 | Thomas et al. | 166/265 |
| 2004/0118749 A1* | 6/2004 | Lesemann et al. | 208/211 |
| 2005/0113450 A1* | 5/2005 | Thorarensen et al. | 514/562 |
| 2005/0227959 A1* | 10/2005 | Yoshida et al. | 514/210.19 |
| 2005/0234044 A1* | 10/2005 | Groneberg et al. | 514/217.04 |
| 2006/0004025 A1* | 1/2006 | Brookings et al. | 514/260.1 |
| 2007/0021382 A1* | 1/2007 | Assaf et al. | 514/63 |
| 2007/0255064 A1* | 11/2007 | Szarvas et al. | 548/335.1 |
| 2008/0058549 A1 | 3/2008 | Jessop et al. | |
| 2008/0112866 A1 | 5/2008 | Davis | |
| 2008/0197084 A1 | 8/2008 | Jessop | |

FOREIGN PATENT DOCUMENTS

| | | |
|---|---|---|
| CA | 2527144 A1 | 11/2005 |
| CA | 2539418 A1 | 3/2006 |
| CA | 2527144 A1 | 5/2007 |
| EP | 2909010 A1 | 11/2006 |
| EP | WO2008068411 A2 | 6/2008 |
| JP | 2003261315 A | 9/2003 |
| WO | 2008/068411 A2 | 6/2008 |
| WO | 2008068411 A2 | 6/2008 |
| WO | 2008122030 A2 | 9/2008 |

OTHER PUBLICATIONS

Jessop, Philip G., et al., Nature, vol. 436, Aug. 25, 2005.
Anderson, Jessica L., et al., The Journal of Physical Chemistry B., vol. 110, No. 31 (2006).
Liu, Yingxin, et al., Science, vol. 313, Aug. 18, 2006.
Huang, Jun, et al., Journal of Molecular Catalysis A: Chemical 279 (2008) pp. 170-176.
Siqueira, Leonardo J. A., et al., The Journal of Physical Chemistry B., vol. 112 (2008).
English translation of International Publication No. WO 2008/ 0668411 A2.
Partial International Search Report.
Wu, Weize, et al., Desulfurization of Flue Gas: SO2 Absorption by an Ionic Liquid, Angewandte Chem. Int. Ed., 2004, 43, 2415-2417.
Yuan, Xiao Liang, et al., Hydroxyl Ammonium Ionic Liquids: Synthesis, Properties, and Solubility of SO2, J. Chem. Eng. Data, 2007, 52, 596-599.
PCT Written Opinion/International Search Report.
Partial International Search Report/Written Opinion.
English Translation of JP 2003/261315.
Heldebrant, David J. et al., CO2-binding organic liquids (CO2BOLs) for post-combustion CO2 capture, Energy Procedia 1 (2009) 1187- 1195.
Heldebrant, David J., et al., Reversible Uptake of COS, CS2, and SO2: Ionic Liquids with O-Alkylxanthate, O-Alkythiocarbonyl, and O-Alkysulfite Anions.

\* cited by examiner

*Primary Examiner*—Timothy C Vanoy
*Assistant Examiner*—Michelle Hou
(74) *Attorney, Agent, or Firm*—Derek H. Maughan (57) ABSTRACT

Reversible acid-gas binding organic liquid systems that permit separation and capture of one or more of several acid gases from a mixed gas stream, transport of the liquid, release of the acid gases from the ionic liquid and reuse of the liquid to bind more acid gas with significant energy savings compared to current aqueous systems. These systems utilize acid gas capture compounds made up of strong bases and weak acids that form salts when reacted with a selected acid gas, and which release these gases when a preselected triggering event occurs. The various new materials that make up this system can also be included in various other applications such as chemical sensors, chemical reactants, scrubbers, and separators that allow for the specific and separate removal of desired materials from a gas stream such as flue gas.

10 Claims, 5 Drawing Sheets

III

CAPTURE AND RELEASE OF MIXED ACID GASSES WITH BINDING ORGANIC LIQUIDS

PRIORITY

This invention claims priority from provisional patent application No. 61/023,994 filed Jan. 28, 2008 the contents of which are hereby incorporated by reference. This application also claims priority to provisional patent application No. 61/099,387 filed Sep. 23, 2008 the contents of which are also hereby incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

Background

The release of greenhouse and acid gases into the air produces local and global effects on the environment. The capture of significant amounts of greenhouse and acid gases from emission sources should reduce the environmental effects of these sources. The combustion of fossil fuels generates the acid gases, carbon dioxide ($CO_2$), sulfur oxides ($SO_2$ and COS), sulfides ($H_2S$) and nitrogen oxides ($NO_x$). Fixed combustion sources, such as coal burning power plants, generate significant acid gas emissions released in their flue gas. The capture and removal of the acid gases, carbon dioxide ($CO_2$), sulfur oxides ($SO_2$, $SO_3$, COS and $H_2S$) and nitrogen oxides ($NO_x$) from flue gas will become an even greater issue as coal becomes more prominent in America's future energy consumption.

Current aqueous flue gas scrubbing technologies are too energy intensive to be used industrially or use toxic materials that complicate implementation. The current aqueous scrubbing technologies remove sulfur oxides and nitrogen oxides from flue gas trapping these acid gases as the basic salts of their acid gases (thiocarbonates, dithiocarbonates, sulfites and nitrate) using a highly basic solution of caustic soda or lime. The binding is stoichiometric and irreversible. The base cannot be reused.

The release of greenhouse and acid gases into the air produces local and global effects on the environment. The combustion of fossil fuels generates acid gases such as carbon dioxide ($CO_2$), sulfur oxides ($SO_2$ and COS), sulfides ($H_2S$) and nitrogen oxides ($NO_x$). Fixed combustion sources, such as coal burning power plants, generate significant acid gas emissions released in their flue gas. The capture and removal of the acid gases, carbon dioxide ($CO_2$), sulfur oxides ($SO_2$, $SO_3$, COS and $H_2S$) and nitrogen oxides ($NO_x$) from flue gas will become an even greater issue as coal becomes more prominent in America's future energy consumption. The capture of significant amounts of greenhouse and acid gases from emission sources is desired to reduce the environmental effects of these sources.

Current aqueous flue gas scrubbing technologies are typically too energy intensive to be used industrially or often require the use of toxic materials which further complicates implementation. Various current aqueous scrubbing technologies remove sulfur oxides and nitrogen oxides from flue gas trapping these acid gases as the basic salts of their acid gases (thiocarbonates, dithiocarbonates, sulfites and nitrate) using a highly basic solution of caustic soda or lime. In these examples the binding is stoichiometric and irreversible and results in a base that cannot be reused. What is needed therefore is a better way of providing an effective method of removing acid gasses that overcomes these deficiencies that exist in the prior art embodiments.

SUMMARY OF THE INVENTION

This application describes reversible acid-gas binding liquid systems that permit capture of one or more of several acid gases, transport of the liquid capture compounds, release of the acid gases from the liquid by the activation of a trigger, and the reuse of these acid-gas binding liquids. These systems can be implemented to allow for the removal of at least a portion of a designated gas from a mixture of gasses pre or post combustion or in any other applications wherein a selective separation of gasses from a mixed stream is desired. The acid gas capture compound is preferably at least one ionic liquid material that can be easily transported to another stage where the acid gas can be removed for storage or processing. These ionic liquids can then be treated with a trigger such as mild heating which causes the ionic liquid to release the acid gas and regenerate the starting materials. Once the acid gas is removed from the organic liquid, the organic liquid is returned to the system and the process repeated. The released acid can captured or released, stored, or further processed as is necessary or desired for particular applications or subsequent additional reuse.

The acid-gas capturing organic materials described herein typically include an acid gas binding liquid comprised of a strong base (preferably, but not limited to amines, amidines or guanidines) and a weak acid (preferably, but not limited to alcohols). The alcohol, base and acid gas chemically react together to form hetero-atom analogues similar in structure to that of alkyl carbonates that are capable of reversible release of the respective acid gas with a trigger event such as mild heating thus regenerating the underlying binding organic bases. While the extent of this mild heating may vary depending upon the materials utilized, the general lower heating allows for the removal of these gasses when the liquid is heated to a temperature less than the boiling point of the liquids. However while this example is provided it is to be distinctly understood that the invention is not limited thereto. The capture of acid gases in organic media as ionic liquids results in compounds that release the acid gases with less energy input as compared to other methods. The reduced hydrogen bonding in organic systems compared to aqueous systems reduces the thermodynamic stability of the chemically bound acid gas and requires less energy to release the acid gas. In addition, the lower specific heat of organic liquid systems (specific heat ~2 J/g/° K) requires only half the energy to heat the liquid compared to that required to heat the water in aqueous systems (specific heat ~4 J/g/° K).

The present invention also includes various methods of capturing and releasing acid gasses as well as various new materials that can be included in various other applications such as chemical sensors, closed system scrubbers, and separators that allow for the specific and separate removal of desired materials from a gas stream such as flue gas. In another embodiment the present invention can be utilized to form thermally stable materials that can also be transported and captured so as to allow for selective capture and sequestration of materials. In addition to being regenerable the present invention also provides for increased capture capacity compared to current alternative embodiments. The system of the present invention also allows for various forms of alteration of the materials themselves wherein the selectivity or separation of materials from a gas stream can be tuned by altering various characteristics of the liquid. For example, variation based upon alteration of at least one characteristic of the liquid such as viscosity, boiling point, surface tension, heat capacity, solvent polarity, miscibility, chemical binding and combinations thereof all can have an effect upon the separation and regeneration characteristics of the material. By altering these characteristics variations to system parameters such as temperature and pressure can then be utilized to control the release of the acid gasses from the ionic liquid. In addition to temperature and pressure a variety of other methods may also be utilized to effect the release of the acid gas from the ionic liquid these include but are not limited to exposing the liquid to heat, light, electricity, pressure, ultrasound, sparging in a lower concentration acid gas environment, and other methods.

While the aforementioned advantages and descriptions have been provided, various additional advantages and novel features of the present invention are described herein and will become further readily apparent to those skilled in this art from the following detailed description. As will be realized, the invention is capable of modification in various respects without departing from the invention. Accordingly, the drawings and description of the preferred embodiment set forth hereafter are to be regarded as illustrative in nature, and not as restrictive.

BRIEF DESCRIPTION OF THE DRAWINGS

FIGS. 4(I) 4(II) 4(III) and 4(IV) show various alternative base embodiments of the present invention.

DESCRIPTION OF THE PREFERRED EMBODIMENTS OF THE INVENTION

The following descriptions include various modes of various embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

As used in this specification the following terms are defined as follows:

"Alcohol" means a molecule of the formula ROH, where R is linear, branched, or cyclic, and may be substituted or unsubstituted, this definition includes all variants including aromatics.

"Amidine" refers to a moiety that contains the N(C=N) moiety. An amide refers to a moiety that contains an amide linkage. An amine is one of a class of compounds that can be considered to be derived from ammonia by replacement of one or more hydrogens with functional groups.

"DBU" is 1,8-diazabicyclo-[5.4.0]-undec-7-ene. "TMG" is 1,1,3,3-tetramethylguanidine. "Barton's base" is 2-tert-Butyl-1,1,3,3-tetramethylguanidine. Hünig's base is N,N-diisopropylethylamine. "MEA" is monoethanolamine.

"Flue gas" is any gaseous effluent.

"Guanidine" refers to a molecule with a structure $R^1N=C(NR^2R^3)(NR^4R^5)$

"Heteroatom analogue" means a composition whose structure is similar to that of another compound but whose composition differs by the substitution of one oxygen or carbon component with another material.

Organic means based on carbon chains, or rings and also containing hydrogen with or without oxygen, nitrogen or other elements.

$SO_2$ binding organic liquids are referred to as $SO_2$BOLs,
COS binding organic liquids are referred to as COSBOLs,
$CS_2$ binding organic liquids are referred to as $CS_2$BOLs,
$H_2S$ binding organic liquids are referred to as $H_2$SBOLs,
$NO_2$ binding organic liquids are referred to as $NO_2$BOLs.

Various examples of embodiments of the present invention are found in FIGS. 1-9. While these illustrated examples are provided it is to be distinctly understood that the invention is not limited thereto but that other embodiments and modifications falling within the spirit and scope of the present invention may be alternatively included.

Acid gases form when a particular gas is contacted with water for example: $H_2CO_3$ is formed when $CO_2$ is contacted with water $H_2SO_3$ is created when $SO_2$ is contacted with water, $H_2OCOS$ from COS, $H_2OCS_2$ from $CS_2$, and $H_2NO_3$ from $NO_2$. Capture of these acid gasses has been demonstrated using organic base and weak acid, in some cases alcohol blends. $CO_2$BOLs for example are based on "Switchable Solvents," discovered by Philip Jessop (Queens University, Canada) and David Heldebrant [Nature (2005), 436, 1102]. Jessop and Heldebrant showed that acid gases such as $CO_2$ act as chemical polarity triggers for mixtures of amidine and guanidine bases and alcohols. The alcohol/amidine or alcohol/guanidine base pair is a liquid blend that chemically binds $CO_2$ to form an ionic liquid composed of an alkylcarbonate salt, which is also a liquid at room temperature. $CO_2$ capture and release has been demonstrated using these base and alcohol blends as $CO_2$BOLs.

These $CO_2$BOLs are non-corrosive, organic liquid acid gas trapping agents that permit pumping of the liquid chemically bound acid gasses and can be regenerated by treatment with heat, pressure, chemicals, light, electricity or even ultrasound. The chemical reactivity of other acid gases in the presence of strong organic bases and alcohols is similar to that of $CO_2$. These acid gases produce thermally reversible liquid salts (See Equations 1-6).

$$CO_2+Base+ROH \rightarrow [Base\ H^+][ROCO_2^-] \quad (1)$$

$$SO_2+Base+ROH = [Base\ H^+][ROSO_2^-] \quad (2)$$

$$COS+Base+ROH \rightarrow [Base\ H^+][ROCOS^-] \quad (3)$$

$$CS_2 + Base + ROH \rightarrow [Base\ H^+][ROCS_2^-] \quad (4)$$

$$NO_2 + Base + ROH \rightarrow [Base\ H^+][RONO_2^-] \quad (5)$$

$$H_2S + CO_2 \rightarrow [BaseH^+][HSCO_2^-] \quad (6)$$

This method of the present invention involves contacting a target stream with a liquid that is capable of binding these gasses under preselected conditions to effect capture of this material into an ionic liquid. This bound material can then be transported to a secondary location and later treated, contacted or subjected to a second set of conditions wherein this bound material can be released. This method can be employed in any arrangement where removal of a particular acid gas from a stream is desired. This includes but is not limited to mixed gas streams such as those arising from pre or post combustion, In addition to $CO_2BOL$ systems which provide reversible $CO_2$ binding with energies<10 kj/mol, high gravimetric capacities for $CO_2$ (as high as 19% volume/volume), and facile reversibility, these other new combinations have now been developed that allow for capture and release of various other acid gasses.

Figure 9:
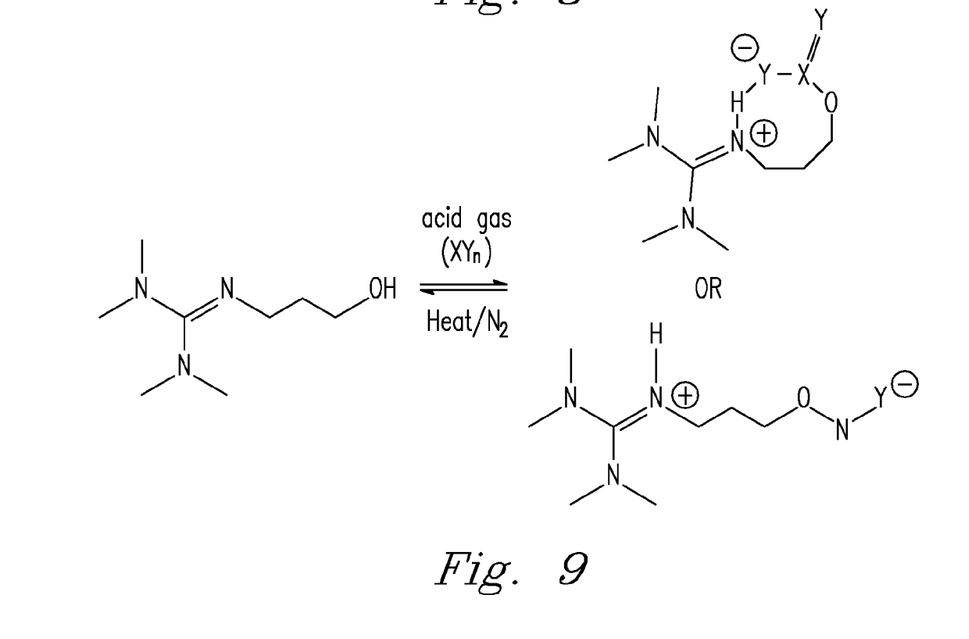
FIG. 9 shows conceptual functionalized guanidine reacting with acid gasses to form a Zwitterionic liquid.

These materials named $SO_2BOLs$, $CS_2BOLs$, COSBOLs, $H_2SBOLs$ and $NO_2BOLs$ can capture and release their respective acid gases with lower binding energies than aqueous lime and caustic soda systems. These materials are also capable of being configured to react at different temperatures and under differing conditions. Thus when a flue gas made up of various materials comes into contact with these materials the acid gas binding reactions can be driven in a particular direction by variation of the characteristics of the materials that are utilized as well as the environmental conditions. This placement of such materials in distinct locations where factors like temperature or pressure may vary (such as the location within an effluent stack or along an effluent conduit) and can be optimized to remove each acid gas independently and cleanly. For example, $CO_2$ can be removed at the low temperatures followed by ramping to a higher temperature and removing $SO_2$, followed by $NO_2$ at even higher temperatures. $H_2S$ can be captured from gas streams concurrently with $CO_2$ when strong bases such as DBU are employed. The $H_2S$ and $CO_2$ react to form a thiobicarbonate ($HSCO_2^-$). The DBU:$CO_2$:$H_2S$ salt is a white solid at room temperature and melts at approximately 65° C. The co-capture of $CO_2$ and $H_2S$ is advantageous for "sweetening" gas streams high in sulfur such as gasified coal. The $H_2S$ can be liberated from this salt thermally near 100° C. Potential applications of this chemistry can be gas sweetening, or delivery of gas streams to the Klaus process (wherein $H_2S$ and $SO_2$ are reacted to form $H_2O$ and elemental sulfur). $H_2S$ is likely able to be co-captured with COS, $CS_2$ or $SO_2$ or $NO_x$. An example of such an embodiment is shown in FIG. 9.

In other applications reacting a CO2BOL with CaOH to form CaHCO3 (limestone) and liberate the underlying base allows for obtaining a sequestrated form of $CO_2$ while recovering the base for $CO_2$ capture. This saves energy for compression of $CO_2$ to form limestone and recovers the base for further $CO_2$ capture. In addition, in some applications diluting a water stream with an alcohol that would competitively bind sites in place of water would reduce bicarbonate formation. Employing hydrophobic reagents such as aliphatic alcohols and bases or fluorination of said compounds to phase-separate water during $CO_2$ capture could also reduce bicarbonate formation. While these examples have been provided it is to be understood that this list is by no means exhaustive and that various alternative embodiments may also be included within the spirit and scope of the present invention.

Figure 4:
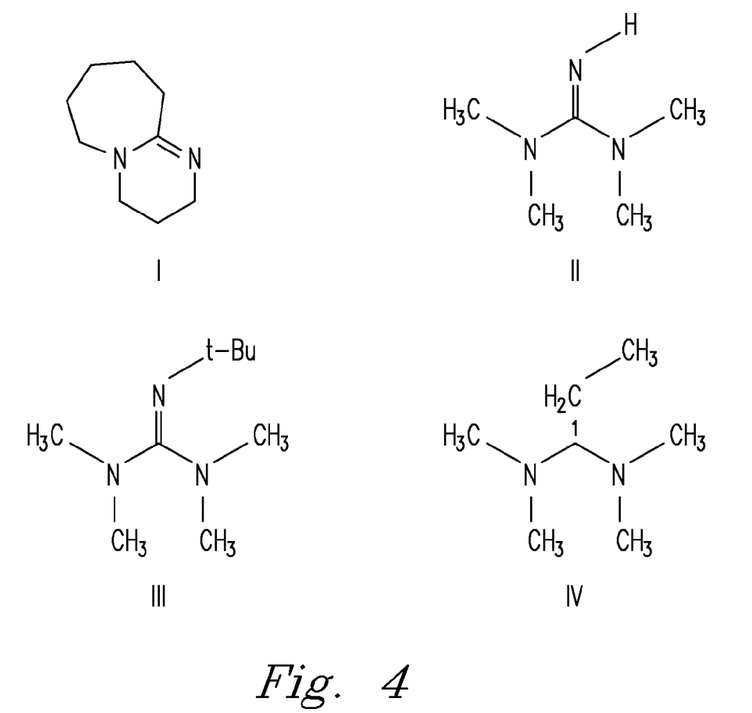
Figure 5:
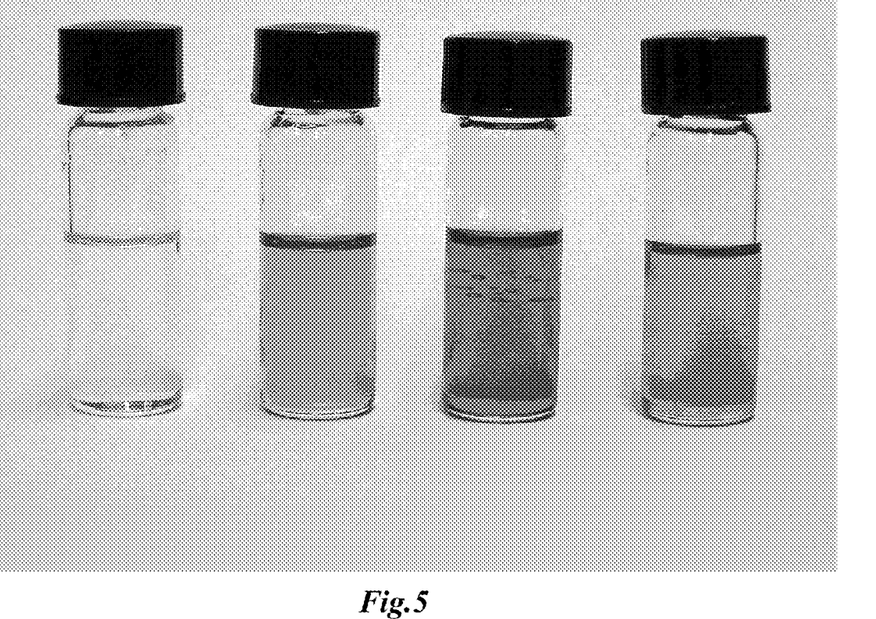
FIG. 5 shows various alternative applications of one set of embodiments of the present invention. In this application DBU+1-hexanol is shown when reacted $CO_2$, COS, $CS_2$, and $SO_2$ FIG. 6. shows the molecular structure of [DBUH$^+$][$^-$S$_2$COCH$_2$Ph FIG. 7. shows the molecular structure of [TMGH$^+$] [HSO$_3^-$].
Figure 6:
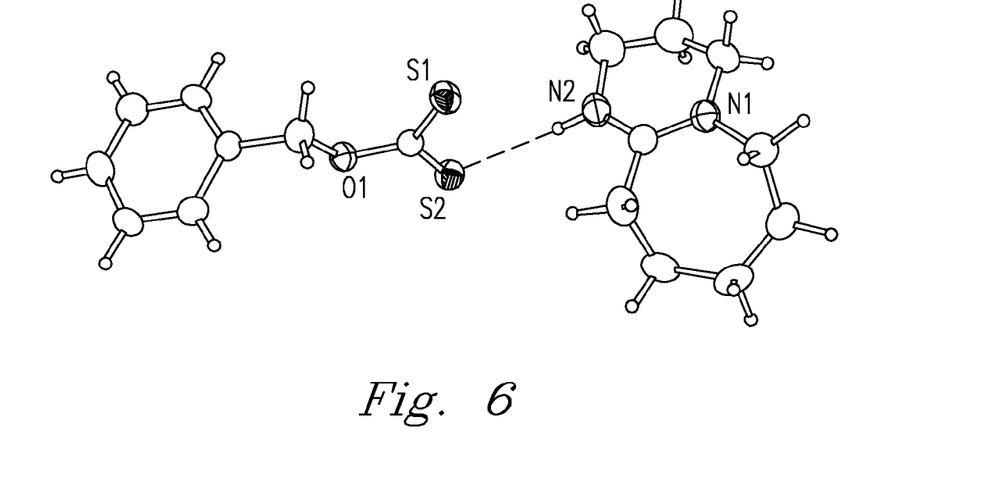
Figure 7:
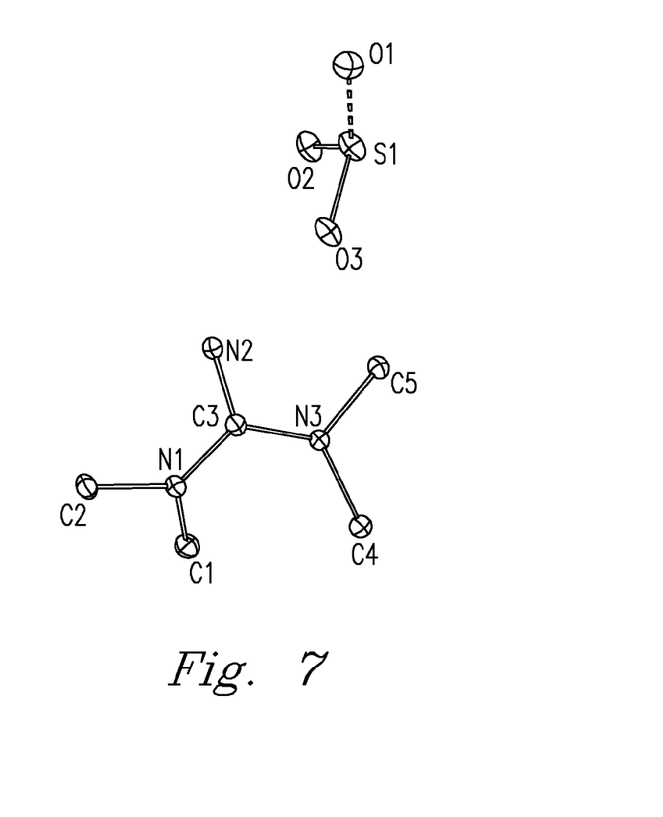
Figure 8:
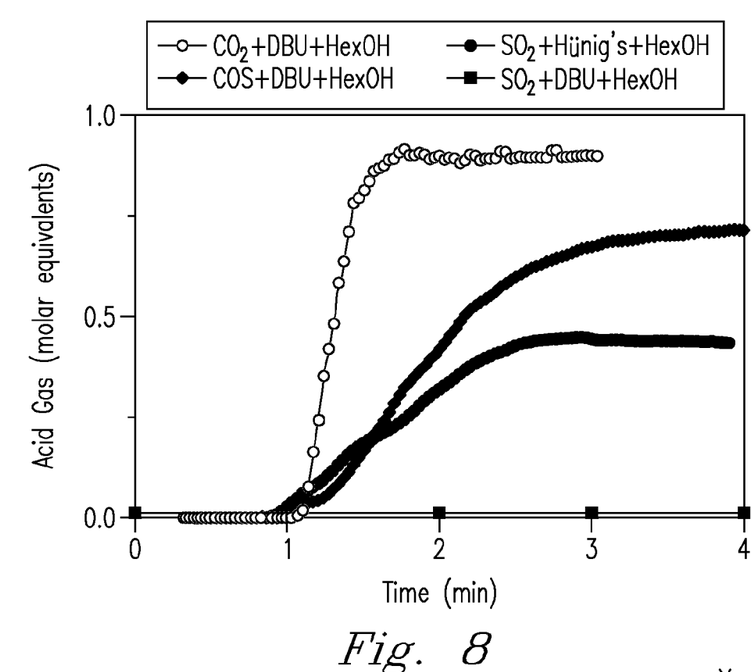
FIG. 8 shows the gas stripping performance of various embodiments of the present invention.

FIGS. 1, 2, 3, 6, 7 and 9 show the chemical structures of various alternative embodiments that may be utilized in the present invention. FIG. 4 shows specific examples of various bases that are utilized in various applications of the present invention. FIG. 5 shows the calorimetric qualities of these materials for potential sensor applications and FIG. 8 shows the gas stripping performance of these materials. While these embodiments and applications are particularly described it is to be distinctly understood that the invention is not limited thereto but may be variously alternatively configured.

Figure 1:
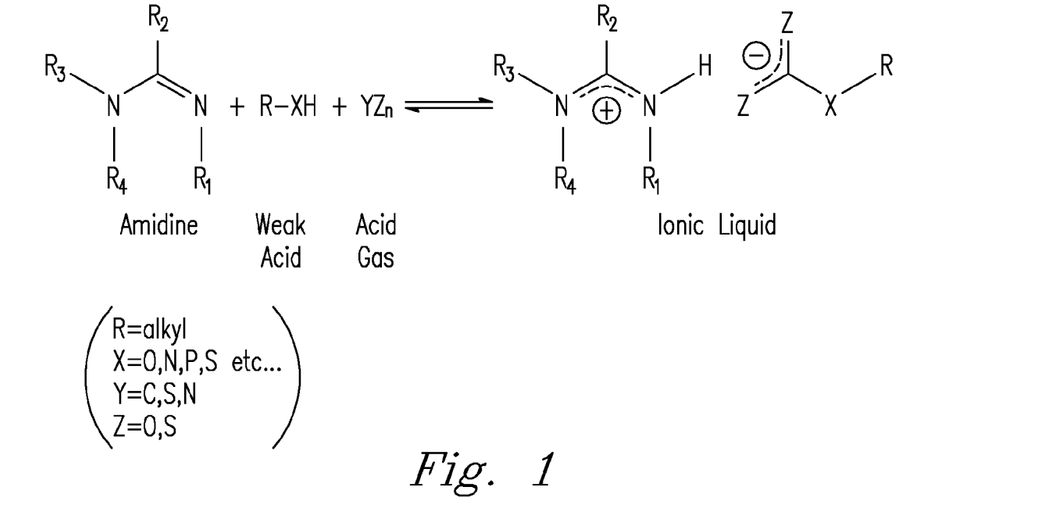
FIG. 1 shows a first embodiment of the present invention
Figure 2:
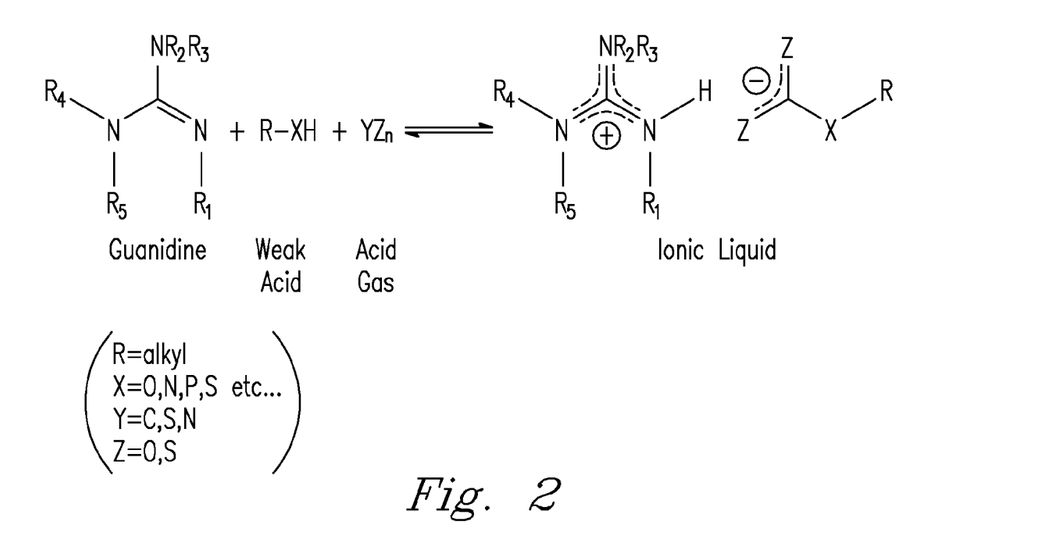
FIG. 2 shows a second embodiment of the present invention
Figure 3:
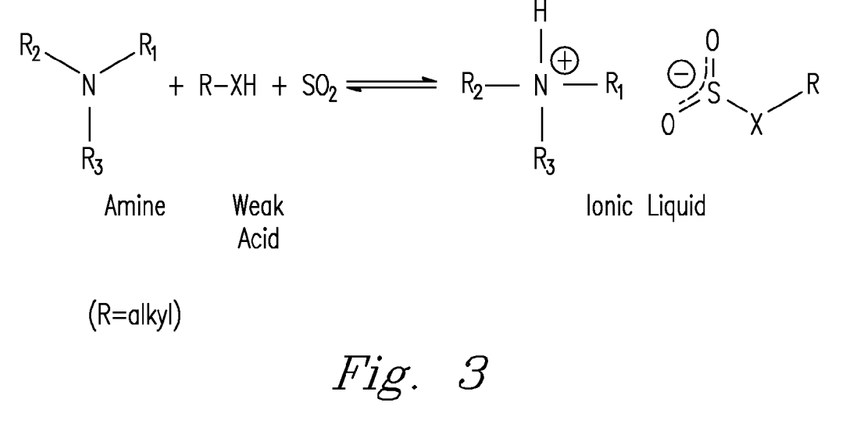
FIG. 3 shows a third embodiment of the present invention

As shown in FIGS. 1-3, the weak acids that are used in this invention are generally alcohols comprised of non-sterically hindered chains from one to ten carbon atoms in length. The preferred chain length is from two to six carbon atoms, but higher temperature $CO_2$ absorption processes could be envisioned based on longer carbon chain alcohols that are solids at room temperature. Branching in the alcohol chain limits the formation of the alkyl-carbonate or hetero-atom analog of alkyl-carbonate due to steric hindrance in formation. These alcohols may be modified by the inclusion of electron donating or electron withdrawing groups (such as, but not limited to fluorines, etc.) that changes the chemical and physical properties of the resulting weak acid (alcohol) R-XH.hetero-alcohol BOLs. The choice of alcohols with the desired chemical and physical properties permits the design of acid gas capture systems that are "tuned" for a specific application or set of conditions. Conditions that may be taken into consideration include temperature, pressure, viscosity, boiling points, solvent dielectric, thermal conductivity, surface tension, heat capacity, solvent polarity, miscibility, chemical binding with alcohol and base blends, and combinations thereof.

The base component for $CO_2$ capture is typically limited to amidines and guanidines but stronger acid gases such as $SO_2$ can be captured with simple amine bases such as triethylamine and Hünig's base (ethyldiisopropylamine). Like the alcohols these bases can also be chemically modified to produce the desired physical and chemical properties for a particular system. Electron donating groups or withdrawing groups can be added to the bases to change binding energies, viscosity, etc. The production of the novel, organic, highly delocalized and weakly hydrogen bonding anions of these $CO_2BOLs$, $SO_2BOLs$, $CS_2BOLs$, COSBOLs, $H_2SBOLs$ and $NO_2BOLs$ provides the low energy requirements for the thermal stripping of each acid gas from the capture compound.

As shown in FIG. 4 a variety of bases may be utilized in the present invention. These include amidines and guanidines such as Diazabicyclo[5.4.0]-undec-7-ene (DBU),. 1,1,3,3 Tetramethylguanidine (TMG), and Barton's base. In addition in some other embodiments Hünig's base and other such simple amine bases such as triethylamine or ethyldiisopropylamine may also be utilized when stronger acid gases such as $SO_2$ are to be captured. In addition to these demonstrated forms that are shown, like the alcohols these bases can also be chemically modified to produce the desired physical and chemical properties for a particular system. Optionally, a solvent may be added to the system to dilute the components and change the viscosity of the mixture. Solvents include any liquids that do not interfere with the desired reaction.

FIG. 5 shows that in one set of experiments 5 novel anions of ionic liquids all demonstrated distinct colors. In this experiment a combination of DBU with 1-hexanol was reacted with $CO_2$ to form a clear solution shown on the far left, COS to have a green color as is shown in the tube second in from the left, $CS_2$ shows an deep orange color as is shown in the third tube from the left and $SO_2$ shows a light amber color as is presented in the tube to the far right. This visual difference while convenient under these testing circumstances may also provide a basis for methods for the qualitative or quantitative field sensing and monitoring of flue gas composition without sophisticated instrumentation.

The binding of each acid gas produces a heteroatom analogue of the alkyl-carbonate with poor hydrogen bonding similar to $CO_2BOLs$. The weak coordination between the cation and anion results in lower hydrogen bonding energies compared to the high hydrogen bonding energies seen in conventional aqueous lime and caustic soda systems. The $CO_2BOLs$, $SO_2BOLs$, $CS_2BOLs$, COSBOLs, $H_2SBOLs$ and $NO_2BOLs$ are all liquid salts at typical operating conditions; the liquid state being attributed to the reduced hydrogen bonding and the long alcohol chains. However in some other embodiments these may be solids at standard conditions. When in a liquid state, these materials can be used and then pumped from one location to another. Preferably without secondary solvents to dissolve the acid gas carriers, however in some embodiments solvents may be desired and such applications are within the scope of the present invention. While these embodiments are described herein as being liquids for various application advantages it is to be distinctly understood that the invention is not limited thereto but may be variously alternatively embodied.

The organic nature of $CO_2BOLs$, $SO_2BOLs$, $CS_2BOLs$, COSBOLs, $H_2SBOLs$ and $NO_2BOLs$ result in systems that require at least 50% less energy to strip acid gases. If an organic and an aqueous system released the same acid gas at the same temperature, the organic system would require less energy as heat because the specific heat of the organic liquids are about half that of the water in aqueous systems. The thermal stripping of the corresponding acid gases from $CO_2BOLs$, $SO_2BOLs$, $CS_2BOLs$, and COSBOLs has been demonstrated, see FIG. 8 and the same release is expected for $H_2SBOLs$ and $NO_2BOLs$. Thermal stripping was demonstrated at temperatures well below the boiling point of the base and alcohols, preventing significant solvent loss and further reducing the energy input required to operate the acid gas capture system relative to that for an aqueous system. In fact many of these materials demonstrated a release of acid gas and regeneration of the solvent at a temperature of less than 120 degrees C, with some occurring as low as 60 degrees C.

$CO_2BOLs$, $SO_2BOLs$, $CS_2BOLs$, COSBOLs $CO_2$ $H_2SBOLs$ and $NO_2BOLs$ can be tailored, combined and mixed to capture and release the specific type and mixture of acid gasses present in a flue gas. Each system can comprise a blend of organic liquids to capture all gases concurrently or can be used sequentially to selectively remove and purify one gas in turn from the stream. This gives the opportunity to design flue gas recovery systems that purify one acid gas from the others and delivers the acid gas for specific processing or storage.

Each system can be modified to run at temperatures from sub-ambient to higher temperatures limited only by the boiling temperatures of the chosen alcohols or bases, e.g., boiling point of the components; DBU base (259° C.), 1-hexanol alcohol (156° C.). Thermal stripping at lower temperatures reduces thermal degradation of the base and alcohols, which can increase the efficiency of the stripping process. Each system can also be modified to release acid gases at reduced pressures to high pressure systems.

These systems an be used on industrial and laboratory scales for any application wherein an acid gas is used as a chemical trigger for to switch solvent polarity, miscibility, or chemical binding with weak acid (alcohol) and base blends. Such examples are flue gas scrubbing, post-combustion absorption of acid gases in numerous fossil fuel combustion processes, and in pre-combustion acid gas absorption in coal gasification and other similar processes. These acid gas binding organic liquids can be direct replacements for lime and caustic soda, being more energy efficient, less corrosive and recyclable. If used on an industrial scale, $CO_2BOLs$, $SO_2BOLs$, $CS_2BOLs$, COSBOLs, $H_2SBOLs$ and $NO_2BOLs$ could reduce the energy requirements and reduce the energy costs for capture of each acid gas for flue gas scrubbing.

Each system can be designed to deliver clean $SO_2$, $CS_2$, COS, $H_2S$, $NO_2$ for post combustion processing, generating products that have economic value. These systems can also be potential acid gas sensors due to their specific color associated with chemical binding of each acid gas. These systems can also be fabricated on solid supports such as silica or alumina to make gas scrubbing respirators or other potential closed system gas scrubbers. These new ionic liquids can be employed as reversible solvents for chemical reactions, separations chemistry as polarity switchable solvents and potentially as ligands for phase-transfer catalysis, as well as potential reversible surfactants, reversible metal complexing, metal capture or chelation; phase catalysis or scrubbing systems; as temperature controlled acid reagents, and in other applications.

The following provides a set of examples of various applications of the present invention. While specific information related to the specific application and embodiments it is to de distinctly understood that the invention is not limited thereto but may be variously alternatively embodied.

EXAMPLE 1

Reaction of COS with DBU and 1-hexanol

The reactivity of COS towards amidine/alcohol and guanidine/alcohol blends was first monitored by changes in conductivity in a solution of diazabicyclo[5.4.0]undec-7-ene (DBU) and 1-hexanol in MeCN. COS absorption by DBU and 1-hexanol was rapid, similar to that of $CO_2$. The uptake of COS was complete within 30 seconds and was mildly exothermic, causing the solution temperature to jump from 24° to 26° C. The conductivity of the MeCN solution was initially 25 µS prior to COS addition likely due to small impurities in solution. The conductivity of the solution rose to 2,000 µS after COS addition, indicating the formation of a salt, which we propose is the O-alkylthiocarbonate salt. Mixtures of COS/DBU and COS/1-hexanol in MeCN were non-conductive, showing that the formation of the charged product from COS is only possible in the presence of both base and alcohol.

The elemental analysis of the isolated product matched that expected for the formulation [DBUH$^+$][$^{-OSCOC}_6H_{13}$]. Spectroscopic characterization of the DBU/1-hexanol/COS ionic liquid was performed using both $^1H$ and $^{13}C$ NMR and IR spectroscopy. The $^1H$ NMR spectrum of 1:1:1 mixtures of DBU, 1-hexanol and COS showed no evidence of free alcohol O—H, and showed the protonated DBU cation at 7.6 ppm (MeCN-d3) for COS which is slightly downfield of the protonated DBU cation observed in our $CO_2$ studies at 7.0 ppm (MeCN-d3). The $^1H$ NMR also showed the downfield shifting of the terminal alcohol R—CH$_2$—O from 3.5 ppm (MeCN-d3) to 3.8 ppm, comparable to the 4.1 ppm of the same methylene in dihexylcarbonate, indicating that the COS was binding to the oxygen of the alcohol and not the imine nitrogen of the base. The $^{13}C$ NMR spectrum showed that the bridgehead carbon in DBU (noted in FIG. 1) shifted downfield, indicative of protonation. DBU shifted from 160.2 (MeCN-d3) ppm to 164.9 ppm (MeCN-d3) with COS, which is similar to the protonated DBUH$^+$ in the $CO_2BOL$ system 164.9 ppm ($CDCl_3$). The thiocarbonyl carbon of the ROC(O) S⁻ anion was observed at 185.5 ppm (MeCN-d3) which is 31 ppm downfield of free COS (154 ppm in solid state and in $SO_2$ at −65° C.). While we were unable to find published $^{13}C$ NMR chemical shift data for RO—C(O)S⁻ anions there are reports of RO—C(O)—SR carbonyl esters at 162-173 ppm ($CDCl_3$) and RO—C(S)—OR thiocarbonyl esters at 203-216 ppm ($CDCl_3$).[26] The RO—C(O)S⁻ anions are less shielded than a corresponding ester and would appear slightly more downfield.

The IR spectrum of DBU/1-hexanol/COS showed evidence of N—H bands at 3223 cm⁻¹ and 3084 cm⁻¹ and no evidence of the broad band of the free OH in 1-hexanol at 3328 cm⁻¹ confirming that DBU is protonated and the alcohol is deprotonated. Most importantly, key bands found in the IR spectra of salts of the structure K⁺[⁻OSCOalkyl] are also found in the spectrum of our product. We assign the observed bands by analogy to the bands of [DBUH⁺]Cl⁻ and K⁺[⁻OSCOalkyl].

TABLE 1

Key IR bands in the spectrum of the product from DBU/1-hexanol/COS, where the proposed structure is [DBUH⁺][$C_6H_{13}H_2OCSO^-$].

| Assignment | Product cm⁻¹ | [DBUH⁺]Cl⁻ cm⁻¹ | K⁺[⁻OSCOalkyl][28] cm⁻¹ |
|---|---|---|---|
| C=N | 1693 | 1649 | |
| C=O | 1573 | | 1580 |
| C—O—C | 1107 | | 1100-1120 |
| C—S | 1060 | | 1055 |

EXAMPLE 2

The Reaction of $CS_2$ with DBU and 1-hexanol $CS_2$ is proposed to bind to amidines and guanidines and alcohols to form the proposed O-alkylxanthate salt. $CS_2$ was very slow to react with DBU and 1-hexanol in MeCN to form the proposed $CS_2$BOL salt. A solution of $CS_2$, DBU and 1-hexanol (0.1 M in each) in MeCN at 24° C. took nearly 2 h to react, with the conductivity of the solution rising from 54 µS to 5,400 µS. The small conductance of the solution prior to $CS_2$ addition is likely due to small impurities in the solution. After $CS_2$ addition, the reaction temperature spontaneously rose from 24° C. to 27° C. over two hours. Equimolar mixtures of $CS_2$/DBU and $CS_2$/1-hexanol showed no conductance, demonstrating that the formation of a charged species with $CS_2$ is only possible in the presence of both base and alcohol.

The product of the reaction of $CS_2$ with DBU and 1-hexanol was characterized with $^1H$, $^{13}C$ NMR, and IR spectroscopy (Table 2). The $^1H$ NMR spectrum of the 1:1:1 mixture of DBU, 1-hexanol and CS2 showed protonated DBU at 8.4 ppm (MeCN-d3), slightly downfield of the $CO_2$ and COS derivatives. There was no evidence of free alcohol O—H, but there was downfield shifting of the alcohol methylene R—$CH_2$—O from 3.5 ppm (MeCN-d3) in the free alcohol to 4.3 ppm in the product. The $^{13}C$ NMR spectrum showed that the bridgehead carbon in DBU shifted downfield to 166.4 ppm (—MeCN-d3), indicative of protonated DBU. Similarly, the [DBUH⁺][$HSO_4^-$] salt is observed at 166.3 ppm in $CDCl_3$. The bound dithiocarbonyl of the $CS_2$BOL was visible downfield at 225.0 ppm (MeCN-d3), 32 ppm downfield of free $CS_2$ in 1-hexanol (193 ppm), and near the reported value for K[$S_2$COMe] in $D_2O$ at 235.6 ppm. The IR spectrum (Table 2) of the DBU/1-hexanol $CS_2$BOL showed no evidence of the free O—H in 1-hexanol. Key bands found in the IR spectra of salts of the structure K⁺[⁻$S_2$COalkyl] are also found in the spectrum of our product.

TABLE 2

Key bands in the IR spectrum of the product of DBU/1-hexanol/$CS_2$, where the proposed structure is [DBUH⁺][$C_6H_{13}H_2OCS_2^-$].

| Assignment | Product cm⁻¹ | [DBUH⁺]Cl⁻ cm⁻¹ | K⁺[⁻$S_2$COEt][29] cm⁻¹ | K⁺[⁻$S_2$COBu][31] cm⁻¹ |
|---|---|---|---|---|
| C=N | 1644 | 1649 | | |
| C—O | 1150 | | 1143 | 1153 |
| C—O—C | 1107 | | | 1107 |
| C=S | 1060 | | 1055 | 1065 |
| $CS_2^-$ | 982 | | | 962 |

While the product of the reaction of DBU and $CS_2$ with 1-hexanol was a liquid, the product from benzyl alcohol was a solid salt, and was characterized crystallographically. Colorless block-shaped crystals of the salt exhibit the xanthate $sp^2$ hybridized $CS_2$ carbon bound through the oxygen of the reagent alcohol. The sulfur atoms are equivalent and consistent with a delocalized xanthate anion with bond lengths of S(1)-C(xanthate) 1.668 Å and S(2)-C(xanthate) 1.681 Å. The S(1)-C(xanthate)-S(2) bond angle is 126.5°.

EXAMPLE 3

The Reaction of $SO_2$ with Amine, Amidine and Guanidine Bases and 1-hexanol

The reaction of $SO_2$ with amidine or guanidine and alcohol blends to form the proposed $SO_2$BOL salt were first monitored by conductivity. $SO_2$ absorption by 0.1 M solutions of DBU and 1-hexanol in MeCN at 27° C. was rapid, with most of the reactions completed within 20 seconds. The $SO_2$ uptake was exothermic as noted by a spike in the temperature from 27° C. to 32° C. The conductivity of the solution rose from 5 µS to 2,900 µS. The increase in conductance suggested $SO_2$ was being chemically bound as a charged species and not just being physically absorbed by DBU and 1-hexanol. There was a minor increase in conductivity (25 to 200 µS) when $SO_2$ was added to 0.1 M DBU in MeCN which is attributed to trace amounts of water reacting to form the DBU bisulfite salt. There was no conductance seen for a solution of $SO_2$ in 0.1 M 1-hexanol in MeCN. Physically absorbed $SO_2$ cannot demonstrate an increase in conductance because there would be no charged species present in solution. The observed increase in conductance of the DBU/$SO_2$/1-hexanol mixture in MeCN suggests that chemical binding of $SO_2$ to form the charged species is only possible when both alcohol and base are present. $SO_2$ and 1-hexanol were found to chemically react with other bases such as 1,1,3,3 tetramethyl guanidine (TMG) and ethyldiisopropylamine (Hünig's base) to form other $SO_2$BOLs.

The DBU/1-hexanol/$SO_2$ system was spectroscopically characterized by $^1H$ and $^{13}C$ NMR spectroscopy. The $^1H$ NMR spectrum showed the greatest downfield shift of the protonated DBU amidinium nitrogen at 10.6 ppm (MeCN-d3) in this study. The [DBUH⁺] chemical shift appears to be linearly correlated to the acidity of the protonating acids (weak to strong: $CO_2$<COS<$CS_2$<$SO_2$). We had shown that the $CO_2$ derivative (5.5 ppm $CDCl_3$) appears to be close in acidity to the trichloroacetic acid salt of DBU [DBUH⁺][$Cl_3CCO_2^-$] (5.5 ppm $CDCl_3$). The pKa of these sulfur analogues of the alkyl carbonic acids are unknown at this time, however the SO$_2$ derivative is closer in acidity to that of the HCl ([DBUH$^+$]Cl) salt (10.2 ppm —MeCN-d3). The $^1$H NMR showed no evidence of free alcohol O—H suggesting the base was the protonated species in solution. The $^{13}$C NMR spectrum showed downfield shifting of the bridgehead carbon in DBU, indicative of protonation, with the DBU shifting from 160.2 ppm (MeCN-d3) to 166.5 ppm which appears to be closer in acidity to the sulfuric acid salt of DBU (166.3 ppm in CDCl$_3$).

Other SO$_2$BOLs were synthesized using TMG and Hünig's base paired with 1-hexanol. The $^1$H NMR spectrum showed the acidic NH$^+$ of TMGH$^+$ at 10.5 ppm (MeCN-d3) and the protonated Hünig's base at 9.2 ppm (MeCN-d3) and no free alcohol O—H suggesting the base was the protonated species in solution. The $^{13}$C NMR spectrum of these other SO$_2$BOLs showed TMGH$^+$ at 166.8 ppm (MeCN-d3), while there was a small 5 ppm downfield shift for Hünig's base at 55.2 ppm (MeCN-d3). No free alcohol O—H was observed with either TMG:1-hexanol or Hünig's base:1-hexanol after reaction with SO$_2$. There was no downfield shifting in the $^1$H NMR spectrum of the alcohol methylene R—CH$_2$—O on SO$_2$ addition with any of the bases studied. The $^{13}$C NMR spectrum shows a slight upfield shift of the methylene from 62 ppm (MeCN-d3) to 59 ppm when SO$_2$ is present, in comparison to 64 ppm in the analogous CO$_2$BOL salt.

The SO$_2$BOLs were also characterized by IR spectroscopy (Table 3). TMG:1-hexanol showed N—H stretching of TMGH$^+$ at 3084 cm$^{-1}$ and 3232 Cm$^{-1}$, and Hüpnig's base had N—H stretching at 3551 cm$^{-1}$ and 3373 cm$^{-1}$. These N—H stretches confirm protonation of the bases, consistent with the $^1$H and $^{13}$C NMR data. Key IR bands in the salts of the structure K$^+$[$^-$O$_2$SOalkyl] were also observed in the spectra of our products. Furthermore the elemental analysis of the DBU/1-hexanol/SO$_2$ ionic liquid matched the theoretical weight percent values of the proposed SO$_2$BOL salt.

gravimetrically. 9 mmol each of DBU and 1-hexanol (combined mass of 2.25 g) absorbed 10 mmol (0.60 g) of COS. The COS uptake was mildly exothermic, and generated a lime green viscous liquid. The characteristic increase in viscosity as seen in our CO$_2$BOL system is consistent with the formation of an ionic liquid and not just physical adsorption of the COS. This is shown in FIG. 5.

A DBU:1-hexanol mixture also reacts with 1 molar equivalent of CS$_2$ making the CS$_2$BOL salt. CS$_2$ is unlike CO$_2$, COS, and SO$_2$ in that it is a liquid that boils at 46° C. CS$_2$ uptake by DBU and 1-hexanol greater than 1 molar equivalent was not studied because liquid CS$_2$ is soluble in the CS$_2$BOL liquid. The addition of 9 mmol of CS$_2$ liquid to 9 mmol of DBU and 1-hexanol was extremely exothermic, coinciding with a rapid color change to orange-red, and the largest increase in viscosity seen in this study.

Three SO$_2$BOLs were produced with TMG/1-hexanol, DBU/1-hexanol, and Hünig's base/1-hexanol reacted with SO$_2$. A 1:1 mixture of TMG and 1-hexanol absorbed 3.0 molar equivalents of SO$_2$, while DBU/1-hexanol and Hünig's/1-hexanol mixtures absorbed 3.0 equivalents of SO$_2$, the highest gas absorption in this study. We attribute the absorption of three equivalents of SO$_2$ to; one equivalent chemically binding to the alcohol and base and then 2 equivalents of SO$_2$ physically dissolving in the generated SO$_2$BOL ionic liquid. Ionic liquids (notably guanidinium cations) have previously been shown to physically absorb up to 2 molar equivalents of SO$_2$. In our SO$_2$ uptake experiments, the TMG/1-hexanol solution initially becomes very viscous and hot while retaining a colorless appearance, which we also saw in the absorption of CO$_2$ in our CO$_2$BOL systems. We feel this observation was due to the chemical binding of SO$_2$ to form the SO$_2$BOL ionic liquid. As more SO$_2$ is bubbled through the SO$_2$BOL, the color changes to a bright yellow-orange and the viscosity begins to decrease. While materials have been dem-

TABLE 3

IR of the products of the reaction of SO$_2$ with base/hexanol mixtures, where the proposed structure is [baseH$^+$][C$_6$H$_{13}$H$_2$OSO$_2$$^+$].

| [DBUH$^+$] [$^-$O$_2$SOR] | [TMGH$^+$] [$^-$O$_2$SOR] | [NEt$^i$Pr$_2$H$^+$] [$^-$O$_2$SOR] | Na[$^-$O$_2$SOCH$_3$]$^{32}$ | K[$^-$O$_2$SOCH$_3$]$^{32}$ |
|---|---|---|---|---|
| 1622 | 1687 | — | — | — |
| 1600 | 1600 | — | — | — |
| 1467 | 1467 | 1467 | 1465 | 1462 |
| 1456 | 1405 | 1395 | 1439 | — |
| 1324 | 1319 | 1319 | — | — |
| 1207 | 1239 | 1239 | — | — |
| 1158 | 1184 | 1184 | 1177 | 1157 |
| — | 1121 | 1110, 1144 | 1119 | 1105 |
| 1037 | 1031 | 1036 | 1039 | — |
| 1001 | — | 982 | — | — |
| 671 | 671 | 673 | 670 | 645 |

The analogous TMG bisulfite was grown with TMG and SO$_2$ and water. Block-shaped yellow crystals of [TMGH$^+$][HSO$_3$$^-$] show the central sulfur bound to one double bonded oxygen with a bond length of S(1)—O(1) 1.365 Å, and two equivalent single bonded oxygens with bond lengths of S(1)—O(2) 1.474 Å, S(1)—O(3) 1.475 Å. In bisulfite anions, the H atom can be bound to the sulfur (HSO$_3$$^-$) or to an oxygen (HOSO$_2$$^-$). The position of the hydrogen atom was not determined in the structure.

COS is gravimetrically absorbed by a DBU/1-hexanol mixture in analogy to the uptake of CO$_2$. DBU/1-hexanol was able to absorb 1.1 molar equivalents of COS gas, measured onstrated that can physically absorb 2 molar equivalents of SO$_2$. However SO$_2$BOLs are superior because they are capable of absorbing 3 molar equivalents. The present invention further differs because the SO$_2$BOL is not an ionic liquid until one equivalent of SO$_2$ is chemically bound.

For all acid gases used in this study, the DBU/1-hexanol solvent pair always remained liquid when binding the acid gases. Unlike the CO$_2$ systems, COS and CS$_2$ and SO$_2$ caused noticeable color changes in DBU and 1-hexanol mixtures. The difference in color between the different acid gases with DBU and 1-hexanol suggests the color is specific to the anion. Ionic liquids with nitrosomethanide anions have similarly been shown to exhibit vivid red and blue colors. O-alkylxanthate, O-alkylthiocarbonate and O-alkylsulfite anions can be used as potential chemical sensors for acid gas detection.

Gas Release

Thermal stripping of the COSBOLs, $CS_2BOLs$ and $SO_2BOLs$ systems was performed to demonstrate their applicability to gas capture and release. As mentioned in our previous work, organic $CO_2BOLs$ were predicted to have a much lower specific heat than aqueous amine systems, making them much more energy efficient to strip $CO_2$. This same property is also expected to hold true for the organic $SO_2BOLs$, COSBOLs and $CS_2BOLs$ compared to aqueous systems. The thermal stripping of each acid gas with the exception of $CS_2$ from the DBU/1-hexanol solvent pair was demonstrated on an automated gas burette system.

All three acid gases were measured for gas stripping at 140° C. see FIG. 8. Each ionic liquid contained exactly 1 molar equivalent of chemically bound acid-gas for the stripping experiments. $CO_2$ was the fastest to strip from DBU and 1-hexanol, losing 1 molar equivalent in 30 seconds showing first order kinetics. COS was the next fastest gas to strip from DBU and 1-hexanol, similarly showing first order kinetics, however only 60% of the COS was removed from the COSBOL at 140° C. after 3 minutes. The incomplete stripping of COS in our burette system is due to an established thermodynamic equilibrium between the gaseous COS and the chemically bound COS in the COSBOL. Complete removal of COS from the COSBOL can be achieved by sparging a gas through the burette at these temperatures or heating the COSBOL to higher temperatures. The release of $CS_2$ from DBU and 1-hexanol was achieved by heating the $CS_2BOL$ to 130° C.-150° C. and condensing the liberated $CS_2$ with a jacketed condenser. The $^{13}C$ NMR spectrum of the clear and colorless distillate showed a singlet at 195 ppm (MeCN-d3) confirming it to be $CS_2$. Extreme care should be taken in the case of heating the $CS_2BOL$ in the presence of moisture; heating $CS_2$ in the presence of $H_2O$ liberates COS and $H_2S$, both are known to be toxic gases. The hydrolysis of $CS_2$ into COS and $H_2S$ proceeds easily because the C—S bond in thiobicarbonate is replaced with a much stronger C—O bond. The alcoholysis of $CS_2$ with alcohols does not proceed to make COS and thiols in analogy to the hydrolysis reaction because the R—$CH_2$—O bond in the alcohol is much less readily cleaved than the H—O bond in water.

The release of the two molar equivalents of physically absorbed $SO_2$ from the $SO_2BOLs$ was rapid and first order with respect to $SO_2$. The physically absorbed $SO_2$ was thermally stripped from TMG/1-hexanol and DBU/1-hexanol at varied temperatures (100° C. to 150° C.) rapidly. Placing the corresponding $SO_2BOL$ under vacuum overnight at room temperature also stripped the physically absorbed $SO_2$. Once the physically absorbed gas had been removed, none of the $SO_2BOL$ liquids showed any further mass loss even after 36 hours under vacuum, indicating that the one equivalent of $SO_2$ was chemically bound and that $SO_2BOLs$ have no appreciable vapor pressure.

The thermal release of chemically bound $SO_2$ from $SO_2BOLs$ was more difficult to accomplish than the removal of the dissolved $SO_2$. Neither DBU/1-hexanol nor TMG/1-hexanol mixtures released chemically bound $SO_2$ at temperatures as high 150° C. a much stronger chemical binding of $SO_2$ than $CO_2$, COS and $CS_2$. The strength of acid gas binding in these systems appears to be linearly correlated to the Lewis acidity of the acid gas in decreasing order; $SO_2>CS_2>COS>CO_2$. While amidines and guanidines did not release chemically bound $SO_2$ at temperatures less than 150° C., a less basic tertiary amine such as Hünig's base when paired with 1-hexanol did release chemically bound $SO_2$ rapidly at 140° C. In the desulfoxylation of the Hünig's base and 1-hexanol $SO_2BOL$, a large reflux condenser (flowing ethylene glycol at 5° C. and a second liquid trap were employed to capture any evaporated Hünig's base and prevent vapors of the base from contributing to the volume of evolved gas measured b the burette. 40% of $SO_2$ was stripped at 140° C. which is due to the thermodynamic equilibrium between gaseous $SO_2$ and chemically bound $SO_2$ in the $SO_2BOL$. Complete stripping of $SO_2$ can be accomplished by flushing gas through the burette or by heating the $SO_2BOL$ to higher temperatures. For $SO_2$ capture and release in a $SO_2BOL$ system, strong bases such as DBU and TMG will not be useful due to their excessively strong binding of $SO_2$. Less basic simple amines such as Hünig's base are a more practical choice. Also, Hünig's base does not form a $CO_2BOL$ or react with $CO_2$ and $H_2O$. The demonstrated selectivity to $SO_2$ over $CO_2$ by simple amines such as Hunig's base make $SO_2BOLs$ attractive $SO_2$ desulfurization solvents for purifying a $CO_2$ stream.

$CO_2BOL$ systems have been shown to chemically react with three sulfur-containing acid gases. COS, $CS_2$ and $SO_2$ react in the same manner as $CO_2$ towards amidine/alcohol and guanidine/alcohol blends. These systems are the first to show reversible binding and release of COS and $CS_2$. The capture of the acid gases with DBU and 1-hexanol results in viscous, colored ionic liquids (green=COS, orange=$SO_2$, red=$CS_2$) containing novel O-alkylxanthate, O-alkylthiocarbonyl and O-alkylsulfite anions. These new colored ionic liquids hold potential as chemical sensors for specific acid gases. Each $SO_2BOL$, COSBOL and $CS_2BOL$ was characterized by spectroscopic and conductivity measurements to confirm the chemical binding of the acid gases to the alkoxide anion. Elemental analysis also confirmed the chemical composition of DBU and 1-hexanol COSBOL, $CS_2BOL$, and $SO_2BOL$ ionic liquids. Each acid gas was thermally stripped from the solvent, showing the potential for reversible COS, $CS_2$ and $SO_2$ capture and release similar to our $CO_2BOL$ system. Hünig's base and 1-hexanol was shown to be selective for $SO_2$ and not $CO_2$ making it an attractive $SO_2$ scrubber. Ultimately base/alcohol mixtures show promise for the capture and release of four different acid gases, showcasing this new class of acid gas-specific scrubbing systems.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A system for capturing $NO_2$, from a gas mixture that includes at least some $NO_2$, characterized by:
    an organic liquid; comprised of a base and an alcohol, that reacts with said $NO_2$ to form a heteroatom analog of alkyl-carbonate and that reversibly traps said $NO_2$ in an ionic liquid wherein $NO_2$, is chemically released by the ionic liquid upon application of a trigger.

2. A method for capturing acid gasses from a mixture of gasses comprising the steps of:
    providing an organic liquid, said organic liquid comprising an alcohol/amidine combination, that is able to reversibly bind an acid gas;
    capturing said acid gas by contacting the organic liquid with said mixture of gasses to reversibly bind the acid gas as ionic liquid;

transporting said ionic liquid to another location;
chemically releasing said acid gas from said ionic liquid; and
reusing said organic liquid.

3. A method for capturing acid gasses from a mixture of gasses comprising the steps of:
provide an organic liquid, said organic liquid comprising an alcohol/guanidine combination, that is able to reversibly bind an acid gas;
capturing said acid gas by contacting the organic liquid with said mixture of gasses to reversibly bind the acid gas as ionic liquid;
transporting said ionic liquid to another location;
chemically releasing said acid gas from said ionic liquid; and
reusing said organic liquid.

4. A system for capturing $SO_2$, from a gas mixture that includes at least some $SO_2$, characterized by:
an organic liquid; comprised of a base and an alcohol, that reacts with said $SO_2$ to form a heteroatom analog of alkyl-carbonate and that reversibly traps said $SO_2$. as an ionic liquid wherein $SO_2$, is released by the ionic liquid upon application of a trigger.

5. A system for capturing a desired acid gas from a mixed gas stream characterized by:
At least one non-ionic organic liquid; comprised of a base and an alcohol, that reacts with a desired acid gas within said acid gas stream to form a heteroatom analog of alkyl-carbonate that reversibly traps said desired acid gas as an ionic liquid.

6. The system of claim 5 wherein said system comprises at least two nonionic organic liquids; each of said nonionic organic liquids comprised of a base and an alcohol, and react with a desired acid gas within said acid gas stream to form a heteroatom analog of alkyl-carbonate that reversibly traps said desired acid gas as an ionic liquid.

7. The system of claim 5 wherein said system further comprises a trigger that when applied to said ionic liquid chemically releases kid gas from said ionic liquid and regenerates said non-ionic organic liquid.

8. The system of claim 5 wherein said system is a closed reactant system.

9. A system for capturing $SO_2$, from a gas mixture that includes at least some $SO_2$ characterized by:
a non ionic organic liquid that reacts with Sato form a heteroatom analogue of alkyl-carbonate and that reversibly traps $SO_2$ as an ionic liquid; and releases $SO_2$ from the ionic liquid upon application of a trigger selected from the group consisting of:
exposing the ionic liquid to heat, light, electricity, ultrasound, sparging in a lower concentration acid gas environment, or combinations thereof.

10. A method for capturing acid gasses from a mixture of gasses comprising the steps of:
providing a non ionic organic liquid that is able to reversibly bind an acid gas;
capturing said acid gas by contacting the organic liquid with said mixture of gasses to reversibly bind the acid gas as ionic liquid;
transporting said ionic liquid to another location;
releasing said acid gas from said ionic liquid; and
reusing said organic liquid
wherein said organic liquid is an alcohol/amidine combination.

* * * * *